(12) United States Patent
Nakamura et al.

(10) Patent No.: US 12,153,914 B2
(45) Date of Patent: Nov. 26, 2024

(54) DATA DISTRIBUTION DEVICE, DATA DISTRIBUTION SYSTEM, AND NON-TRANSITORY COMPUTER-READABLE STORAGE MEDIUM

(71) Applicants: DENSO CORPORATION, Kariya (JP); TOYOTA JIDOSHA KABUSHIKI KAISHA, Toyota (JP)

(72) Inventors: Syo Nakamura, Kariya (JP); Yuzo Harata, Toyota (JP); Kazuhiro Uehara, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 17/889,478

(22) Filed: Aug. 17, 2022

(65) Prior Publication Data
US 2022/0391195 A1    Dec. 8, 2022

Related U.S. Application Data

(63) Continuation of application No. PCT/JP2021/005927, filed on Feb. 17, 2021.

(30) Foreign Application Priority Data

Feb. 19, 2020   (JP) .................................. 2020-026299

(51) Int. Cl.
G06F 8/65          (2018.01)
(52) U.S. Cl.
CPC ...................................... G06F 8/65 (2013.01)

(58) Field of Classification Search
CPC ......................................................... G06F 8/65
See application file for complete search history.

(56) References Cited

U.S. PATENT DOCUMENTS

| 11,714,628 B2 * | 8/2023 | Miyauchi | H04L 67/34 |
| | | | 717/170 |
| 2008/0262721 A1 | 10/2008 | Guo et al. | |
| 2017/0008562 A1 | 1/2017 | Shashua et al. | |
| 2019/0050217 A1 * | 2/2019 | Tatourian | G06F 8/65 |
| 2019/0050219 A1 * | 2/2019 | Seki | H04L 67/12 |
| 2019/0266017 A1 | 8/2019 | Nakamura et al. | |

FOREIGN PATENT DOCUMENTS

| CN | 104793975 A | * | 7/2015 | |
| DE | 102016210675 A1 | * | 12/2016 | ........... B60R 16/023 |
| JP | 2008051612 A | | 3/2008 | |
| JP | 2008267875 A | | 11/2008 | |
| JP | 2018510373 A | | 4/2018 | |
| JP | 2018092577 A | | 6/2018 | |
| WO | WO-2019058652 A1 | * | 3/2019 | |

* cited by examiner

*Primary Examiner* — Phillip H Nguyen
(74) *Attorney, Agent, or Firm* — Harness, Dickey & Pierce, P.L.C.

(57) ABSTRACT

A data distribution device for a master device transferring an update data to electronic control devices: acquires multiple update data corresponding to the electronic control devices as a writing target; acquires recombination information for the master device to execute a transfer process; divides the update data based on the recombination information to generate a division data; packages the division data to generate packages; and distributes the packages to the master device.

21 Claims, 9 Drawing Sheets

DATA DISTRIBUTION DEVICE, DATA DISTRIBUTION SYSTEM, AND NON-TRANSITORY COMPUTER-READABLE STORAGE MEDIUM

CROSS REFERENCE TO RELATED APPLICATION

The present application is a continuation application of International Patent Application No. PCT/JP2021/005927 filed on Feb. 17, 2021, which designated the U.S. and claims the benefit of priority from Japanese Patent Application No. 2020-026299 filed on Feb. 19, 2020. The entire disclosures of all of the above applications are incorporated herein by reference.

TECHNICAL FIELD

The present disclosure relates to a data distribution device, a data distribution system and a non-transitory computer-readable storage medium.

BACKGROUND

Conventionally, a data distribution system includes a data distribution device that distributes update data such as a repro program, a master device that transfers update data downloaded from the data distribution device, and an electronic control device (hereinafter, an ECU that is Electronic Control Unit) that writes the update data transferred from the master device to a memory. For example, a conceivable technique provides for improving the transfer efficiency of updated data from the master device to the plurality of write target ECUs by executing the transfer process of the update data in parallel from the master device to the plurality of write target ECUs.

SUMMARY

According to an example, a data distribution device for a master device transferring an update data to electronic control devices: acquires multiple update data corresponding to the electronic control devices as a writing target; acquires recombination information for the master device to execute a transfer process; divides the update data based on the recombination information to generate a division data; packages the division data to generate packages; and distributes the packages to the master device.

BRIEF DESCRIPTION OF THE DRAWINGS

The above and other objects, features and advantages of the present disclosure will become more apparent from the below-described detailed description made with reference to the accompanying drawings. In the drawings.

DETAILED DESCRIPTION

Figure 1:
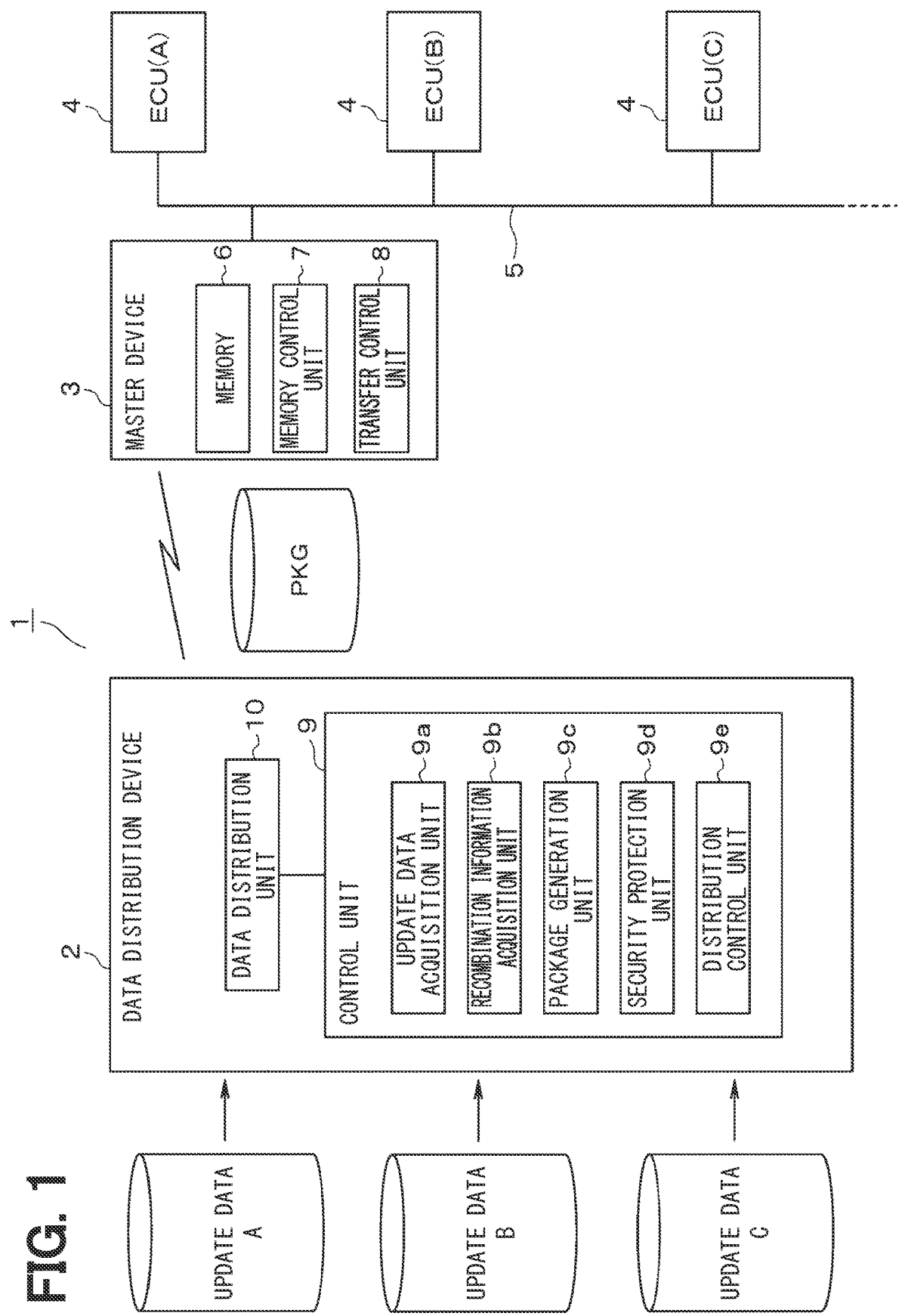
FIG. 1 is a diagram showing an entire system configuration according to a first embodiment.
Figure 2:
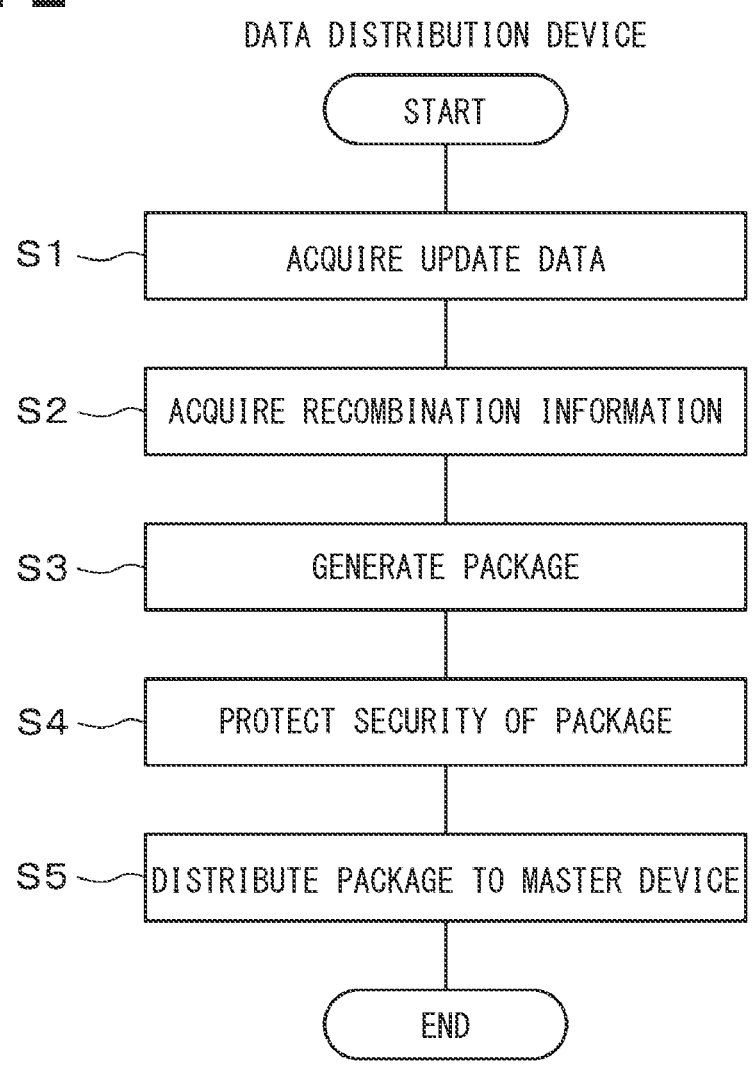
FIG. 2 is a flowchart showing a process performed by a data distribution device.
Figure 3:
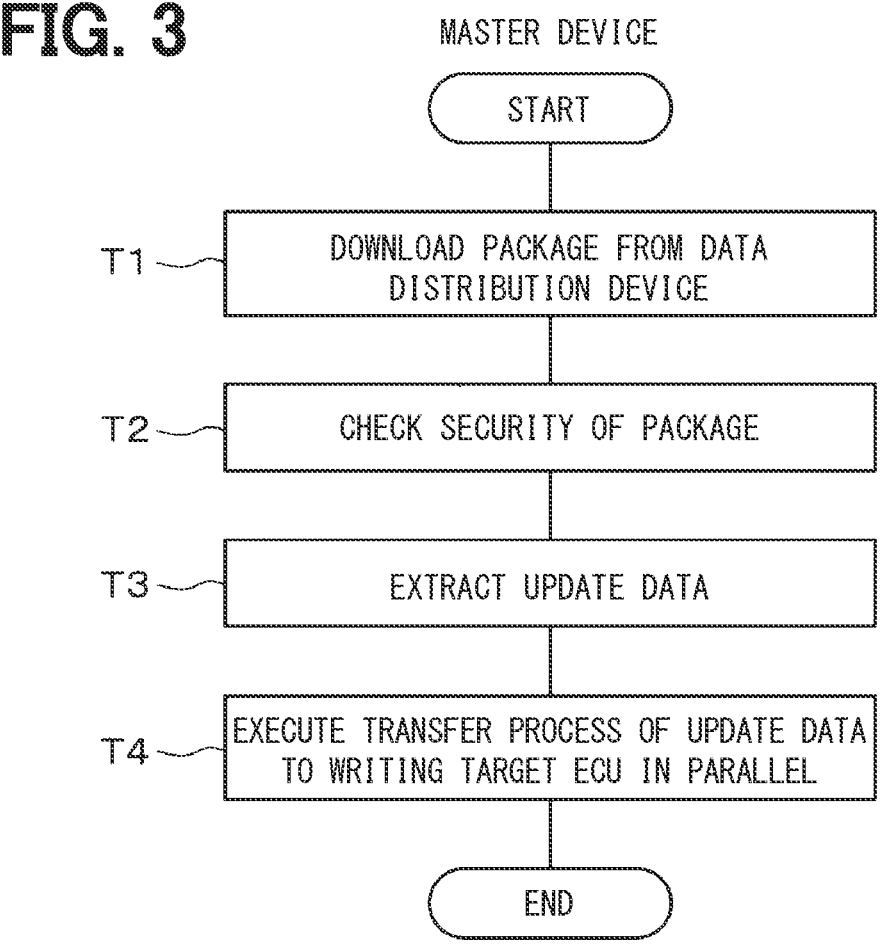
FIG. 3 is a flowchart showing a process performed by the master device.

According to a conceivable technique, a master device has a configuration in which the update data downloaded from the data distribution device is temporarily stored in a memory, and the once stored update data is sequentially read out from the memory and transferred to the write target ECU. However, there may be a case where the memory of the master device does not have a sufficient storage capacity for downloading all the update data for a plurality of ECUs to be written. In that case, there may be a possibility that the mechanism for executing the transfer process of the update data from the master device to the plurality of write target ECUs in parallel cannot be appropriately utilized.

The present embodiments appropriately provides a mechanism for executing the transfer process for the update data from the master device to a plurality of electronic control devices as a writing target in parallel under a situation where the master device downloads the update data distributed from the data distribution device.

According to one aspect of the present embodiments, the update data acquisition unit acquires a plurality of update data corresponding to a plurality of electronic control devices as a writing target. The recombination information acquisition unit acquires recombination information for the master device to execute the transfer process of the update data to a plurality of electronic control devices as a writing target in parallel. When a plurality of update data are acquired by the update data acquisition unit, the package generation unit divides the acquired plurality of update data based on the recombination information acquired by the recombination information acquisition unit to generate division data, and generates a plurality of packages by packaging the generated division data of the plurality of update data. When a plurality of packages are generated by the package generation unit, the distribution control unit controls the master device to distribute the generated plurality of packages.

When the recombination information is acquired for the master device to execute the transfer process of the update data to a plurality of electronic control devices as a writing target in parallel, and a plurality of update data are acquired, the acquired multiple update data are divided based on the recombination information to generate division data, the division data of the generated multiple update data is packaged to generate a plurality of packages, and the generated multiple packages are distributed to the master device. By distributing the multiple packages to the master device so that the master device can execute the transfer process for transferring the update data to multiple write target electronic control devices in parallel, it is possible to appropriately utilize a mechanism for executing the transfer process of the update data from the master device to a plurality of electronic control devices as a writing target in parallel under a situation where the master device downloads the update data distributed from the data distribution device.

Hereinafter, one embodiment will be described with reference to the drawings. The data distribution system 1 is a vehicular electronic control system including a data distribution device 2, a master device 3 mounted on the vehicle, and an electronic control device (hereinafter referred to as an ECU (i.e., Electronic Control Unit)) 4. Further, it is a system that can rewrite application programs such as vehicle control and diagnosis implemented in the ECU 4. In this embodiment, a case where the ECU 4 writes a repro program such as a new version of the program as update data in the memory to rewrite the application program is described as an example, alternatively, the embodiment may provide a case where, for example, a control parameter used by the ECU 4 or an application data used in an application such as a map data in an map application is rewritten. That is, the update data is a repro program, a control parameter, application data, and the like. The write target ECU 4 as a writing target of the update data is, for example, each ECU 4 that controls the vehicle body system, each ECU 4 that controls the traveling system, each ECU 4 that controls the multimedia system, and the like.

The data distribution device 2 is a center device, for example, a factory device disposed in a factory such as a manufacturing factory or a maintenance factory, a diagnostic tool that can be carried by a worker, and the like, and when the update data is registered, the registered update data is packaged so that a package of the update data is formed, and the generated package is distributed to the master device 3. The package generated by the data distribution device 2 is configured to include a file such as a compressed file. When the data distribution device 2 is a center device, it wirelessly connects to the master device 3 via a wide area communication line such as a 3G line or a 4G line, and distributes the package to the master device 3. When the data distribution device 2 is a factory device or a diagnostic tool, the data distribution device 2 is wirelessly connected to the master device 3 via a short-range communication line such as WiFi (registered trademark) or Bluetooth (registered trademark), or is connected to the master device 3 via a cable. Thus, the package is delivered to the master device 3. That is, the data distribution system 1 is a system in which the application program installed on the ECU 4 can be rewritten either wirelessly or by wire.

The master device 3 and the plurality of ECUs 4 are connected to each other via a bus 5. The bus 5 corresponds to, for example, CAN (controller area network, registered trademark), LIN (local interconnect network, registered trademark), CXPI (clock extension peripheral interface, registered trademark), FlexRay (registered trademark), MOST (media oriented systems transport, registered trademark), or the like. These buses have different communication protocols and different communication speeds and different signal formats.

The master device 3 is provided by a microcomputer having a CPU (Central Process Unit), a ROM (Read Only Memory), a RAM (Random Access Memory), and an I-O (Input-Output). The microcomputer executes computer programs stored in a non-transitory tangible storage medium to execute processing corresponding to the computer programs, and controls an overall operation of the master device 3. The master device 3 includes a memory 6 having a predetermined storage capacity, a memory control unit 7, and a transfer control unit 8. The memory control unit 7 downloads a package from the data distribution device 2, and temporarily stores the downloaded package in the memory 6. The transfer control unit 8 reads the package stored in the memory 6, unpackages the read package, extracts the update data, and transfers the extracted update data to the write target ECU 4.

When the installability condition for the write target ECU 4 is satisfied, the master device 3 instructs the write target ECU 4 to install and causes the write target ECU 4 to install the update data. The installability conditions are, for example, such that the user has performed an installation consent operation, that the vehicle state is in an installable state, that the write target ECU 4 is in an installable state, that the update data is normal data, and the like.

Specifically, the master device 3 determines that the vehicle state is in an installable state by, for example, determining that the remaining battery level of the in-vehicle battery is equal to or greater than a predetermined capacity or determining that the environment is not improper. The master device 3 determines that the write target ECU 4 is in an installable state by, for example, determining that the memory structure of the write target ECU 4 is normal or determining that the communication load of the bus 5 is less than a predetermined level. The master device 3 determines that the updated data is normal data, for example, by determining that the updated data is data that has not been falsified or destroyed.

Further, when the installation of the update data in the write target ECU 4 is completed, the master device 3 instructs the write target ECU 4 to activate the installed update data as a valid data, and causes the write target ECU 4 to activate the update data. The activation condition is, for example, that the user has performed an activation consent operation, that the vehicle state is in an activation state, that the write target ECU 4 is in an activation state, and the like.

Specifically, the master device 3 determines that the vehicle state is in an activation state by, for example, determining that the vehicle is in a parked state or determining that the remaining amount of the in-vehicle battery is equal to or greater than a predetermined capacity. The master device 3 determines that the write target ECU 4 is in an activation state by, for example, determining that the update data written in the memory of the write target ECU 4 is normal.

When the master device 3 determines that a plurality of processing requests have been received at the same time, the master device 3 arbitrates the plurality of processing requests based on the priority of the received processing requests, the state of the bus 5, the state of the write target ECU 4, and the like, and executes a process corresponding to a plurality of processing requests simultaneously received at the same time in parallel. When, for example, the master device 3 simultaneously receives a processing request for transferring the update data to the writing target ECU A and a processing request for transferring the update data to the writing target ECU B, the master device 3 executes the transfer process for transferring the update data A to the writing target ECU A and the transfer process for transferring the update data B to the writing target ECU B in parallel. When the master device 3 determines that a plurality of simultaneous processes are necessary for executing, the master device 3 performs the processes determined to be necessary for executing the simultaneous processes in parallel, as in the case of determining that the plurality of processing requests are received at the same time.

The master device 3 transmits configuration information to the data distribution device 2 when data communication with the data distribution device 2 is possible, for example, at the timing when the ignition of the vehicle is switched from an off state to an on state. The configuration information transmitted from the master device 3 to the data distribution device 2 is information on the vehicle side, and includes: the data transfer speed from the master device 3 to the write target ECU 4, the storable capacity of the memory 6 of the master device 3, hardware information about the hardware of the write target ECU 4, software information about the software stored in the write target ECU 4, and the like. In addition to the timing when the ignition of the vehicle is switched from the off state to the on state, the master device 3 may transmit the configuration information to the data distribution device 2 at the timing when the transmission request for the configuration information is received from the data distribution device 2, for example. That is, the data distribution device 2 acquires the configuration information from the master device 3 at an arbitrary timing.

The data distribution device 2 has a control unit 9 and a data distribution unit 10. The control unit 9 is provided by a microcomputer having a CPU (Central Process Unit), a ROM (Read Only Memory), a RAM (Random Access Memory), and an I-O (Input-Output). The microcomputer executes computer programs stored in a non-transitory tangible storage medium to execute processing corresponding to the computer programs, and controls an overall operation of the data distribution device 2. A computer program executed by a microcomputer includes a data distribution program. The control unit 9 includes an update data acquisition unit 9*a*, a recombination information acquisition unit 9*b*, a package generation unit 9*c*, a security protection unit 9*d*, and a distribution control unit 9*e*.

The update data acquisition unit 9*a* acquires the update data by designating the write target ECU 4 by the operator and registering the update data for the write target ECU 4. The recombination information acquisition unit 9*b* acquires the recombination information by receiving the configuration information transmitted from the master device 3. The recombination information is information for the master device 3 to execute the transfer process of the update data to the plurality of write target ECUs 4 in parallel, and the recombination information acquisition unit 9*b* acquires some recombination information described below. The recombination information acquisition unit 9*b* acquires a storable capacity as recombination information by one download opportunity in the master device 3. The recombination information acquisition unit 9*b* acquires, as recombination information, distribution speed information regarding the distribution speed of the package from the data distribution device 2 to the master device 3, transfer speed information regarding the transfer speed of the update data from the master device 3 to the write target ECU 4, and speed difference information regarding the speed difference between the distribution speed and the transfer speed. The recombination information acquisition unit 9*b* acquires, as recombination information, a writable capacity in which the update data can be written by one writing opportunity in the write target ECU 4, a write speed of the update data, a total writing capacity of the update data, and an execution unit of the writing process. The recombination information acquisition unit 9*b* may use information predetermined for each vehicle type as the recombination information.

When a plurality of update data are acquired by the update data acquisition unit 9*a*, the package generation unit 9*a* divides the acquired plurality of update data based on the recombination information acquired by the recombination information acquisition unit 9*b* to generate division data, and generates a plurality of packages by packaging the generated division data. In this case, the package generation unit 9*c* determines the size of the package, determines the configuration of the update data in the package, and generates the package according to the determined size of the package and the configuration of the update data in the package.

The package generation unit 9*c* determines the acquired storage capacity when the recombination information acquisition unit 9*b* acquires the storage capacity of the master device 3 that can store by one download opportunity, and determines the size of the package. Since the storage capacity of the memory 6 of the master device 3 is finite, the package generation unit 9*c* determines the size of the package so as to be equal to or less than the storage capacity of the memory 6 of the master device 3.

Further, the package generation unit 9*c* determines the structure of the update data in the package by comprehensively checking the acquired distribution speed information, transfer speed information, speed difference information, writing capacity, writing speed, total writing capacity, and execution unit when the information acquisition unit 9*b* acquires the distribution speed information regarding the distribution speed of the package from the data distribution device 2 to the master device 3, transfer speed information regarding the transfer speed of the update data from the master device 3 to the write target ECU 4, the speed difference information related to the speed difference between the distribution speed and the transfer speed, the writing capacity in which the update data can be written by one writing opportunity in the write target ECU 4, the writing speed of the update data, the total writing capacity of the update data, and the execution unit of the writing process. The configuration of the update data is the distribution of the update data corresponding to the write target ECUs 4. The speed difference between the distribution speed and the transfer speed may be calculated by either the data distribution device 2 or the master device 3.

In general, the distribution speed of the package from the data distribution device 2 to the master device 3 is faster than the transfer speed of the update data from the master device 3 to the write target ECU 4, so that the package generation unit 9*c* determines the structure of the update data in the package so as to reduce the waiting time for the update data to wait for transfer in the master device 3 by generating a package by mixing update data corresponding to the plurality of target ECUs 4 to package the update data.

The package generation unit 9*c* determines the structure of the update data in the package so that the data amount of the update data is relatively large for the writing target ECU 4 having a relatively large writable capacity, and the data amount of the update data is relatively small for the writing target ECU 4 having a relatively small writable capacity. The package generation unit 9*c* determines the structure of the update data in the package so that the data amount of the update data is relatively large for the writing target ECU 4 having a relatively high writing speed, and the data amount of the update data is relatively small for the writing target ECU 4 having a relatively low writing speed. The package generation unit 9*c* determines the structure of the update data in the package so that the data amount of the update data is relatively large for the writing target ECU 4 having a relatively large total writable capacity, and the data amount of the update data is relatively small for the writing target ECU 4 having a relatively small total writable capacity. Further, the package generation unit 9*c* determines the structure of the update data in the package so that the amount of data to be transferred at one time matches the execution unit of the writing process.

Thus, when the package generation unit 9*c* determines the size of the package, and determines the structure of the update data in the package, the package generation unit 9c generates the package according to the determined size of the package and the structure of the update data in the package. When the package is generated by the package generation unit 9c, the security protection unit 9d protects the security of the generated package by, for example, encrypting the package. When the security of the package is protected by the security protection unit 9d, the distribution control unit 9e sequentially distributes the security-protected package from the data distribution unit 10 to the master device 3.

Next, an operation of the above configuration will be described with reference to FIGS. 2 to 9.

In the data distribution device 2, the control unit 9 acquires the update data by registering the update data (at S1 corresponding to the update data acquisition procedure), and receives the configuration information transmitted from the master device 3 to acquire the recombination information (at S2 corresponding to the recombination information acquisition procedure). The control unit 9 divides the update data based on the recombination information to generate the division data, and packages the generated division data to generate a plurality of packages (at S3 corresponding to the package generation procedure). That is, the control unit 9 determines the size of the package and the structure of the update data in the package, and generates the package according to the determined size of the package and the structure of the update data in the package. When the control unit 9 generates a package, the control unit 9 protects the security by, for example, encrypting the generated package (at S4). The control unit 9 distributes the security-protected package from the data distribution unit 10 to the master device 3 (at S5 corresponding to the distribution control procedure).

When the master device 3 downloads a package from the data distribution device 2 (at T1), the master device 3 verifies the security by, for example, decrypting the downloaded package (at T2). The master device 3 unpackages the security-verified package and extracts the update data (at T3). When the master device 3 extracts the update data, the master device 3 executes the transfer process of the update data to the writing target ECU 4 in parallel (at T4).

Figure 4:
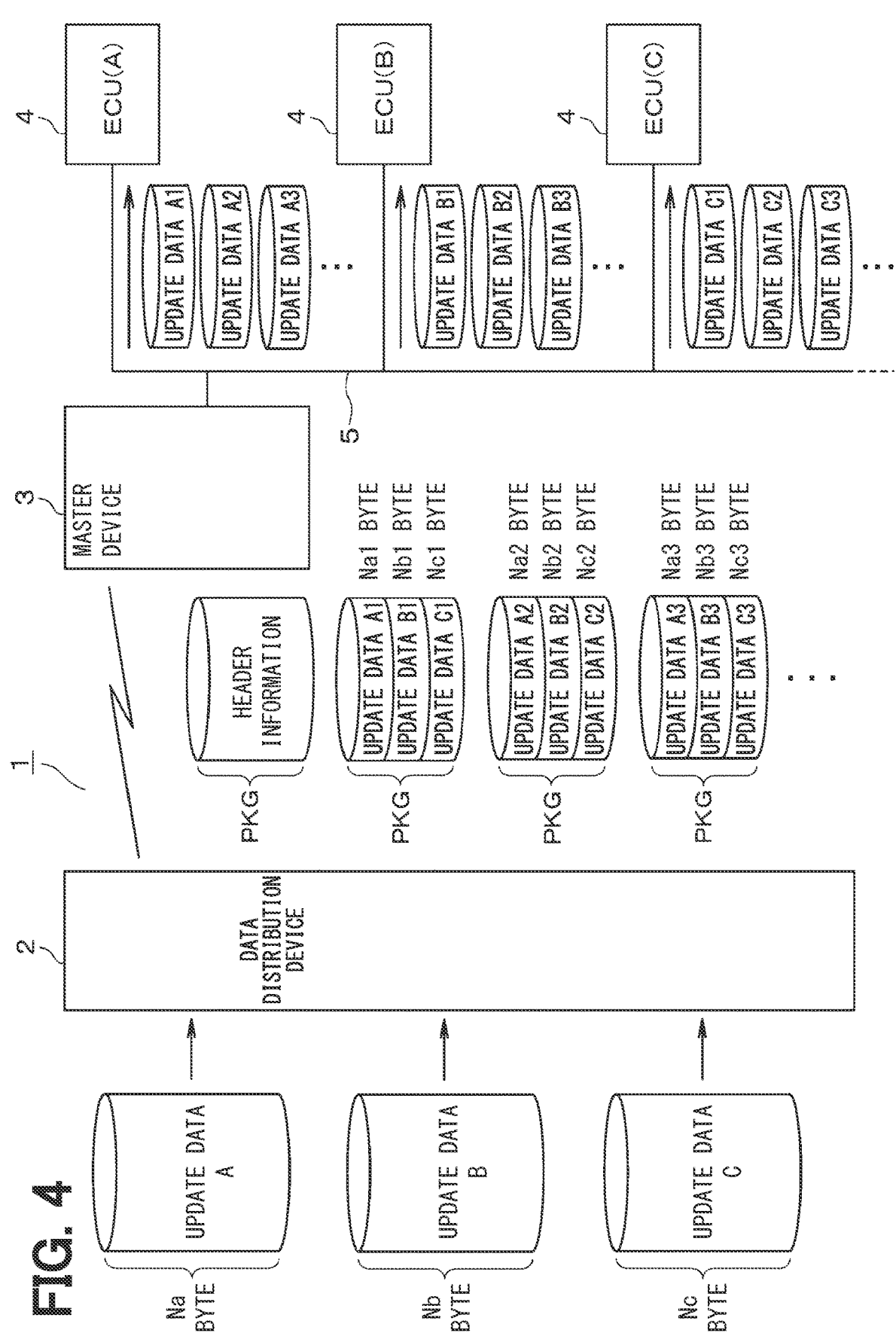
FIG. 4 is a diagram showing a feature in which a data distribution device generates a package.

Specifically, it will be described with reference to FIGS. 4 to 7. As shown in FIG. 4, the control unit 9 determines the size of the package and the structure of the update data in the package based on the recombination information, for example, when acquiring the update data A having a data amount of Na bytes corresponding to the writing target ECU A, the update data B having a data amount of Nb bytes corresponding to the writing target ECU B, and the update data C having a data amount of Nc bytes corresponding to the writing target ECU C. For example, the control unit 9 divides the update data A into an update data A1 having Na1 bytes, an update data A2 having Nat bytes, and an update data A3 having Na3 bytes. Similarly, the control unit 9 divides the update data B into an update data B1 having Nb1 bytes, an update data B2 having Nb2 bytes, and an update data B3 having Nb3 bytes. The control unit 9 divides the update data C into an update data C1 having Nc1 bytes, an update data C2 having Nc2 bytes, and an update data C3 having Nc3 bytes. The write target ECU A, the write target ECU B, and the write target ECU C correspond to the first target device which is the first writing target electronic control device and the second target device which is the second writing target electronic control device. The update data A1, A2, A3, the update data B1, B2, B3, and the update data C1, C2, C3 divided based on these recombination information are division data, and correspond to the first division data and the second division data.

The control unit 9 packages the header information including the specification data in which the information related to the rewriting of the application program is specified to generate a package, protects a security of the generated package, and distributes the generated package from the data distribution unit 10 to the master device 3. Next, the control unit 9 packages the update data A1, the update data B1, and the update data C1 into one file to generate a package, protects a security of the generated package, and distributes the generated package from the data distribution unit 10 to the master device 3. After that, the control unit 9 performs the same processing on the update data A2, the update data B2, and the update data C2, and also performs the same processing on the update data A3, the update data B3, and the update data C3. The control unit 9 distributes the package from the data distribution unit 10 to the master device 3 when the package distribution request is received from the master device 3. In this way, the control unit 9 sequentially distributes the package including the update data A1, the update data B1 and the update data C1, the package including the update data A2, the update data B2 and the update data C2, the package including the update data A3, the update data B3, and the update data C3 from the data distribution unit 10 to the master device 3.

Figure 5:
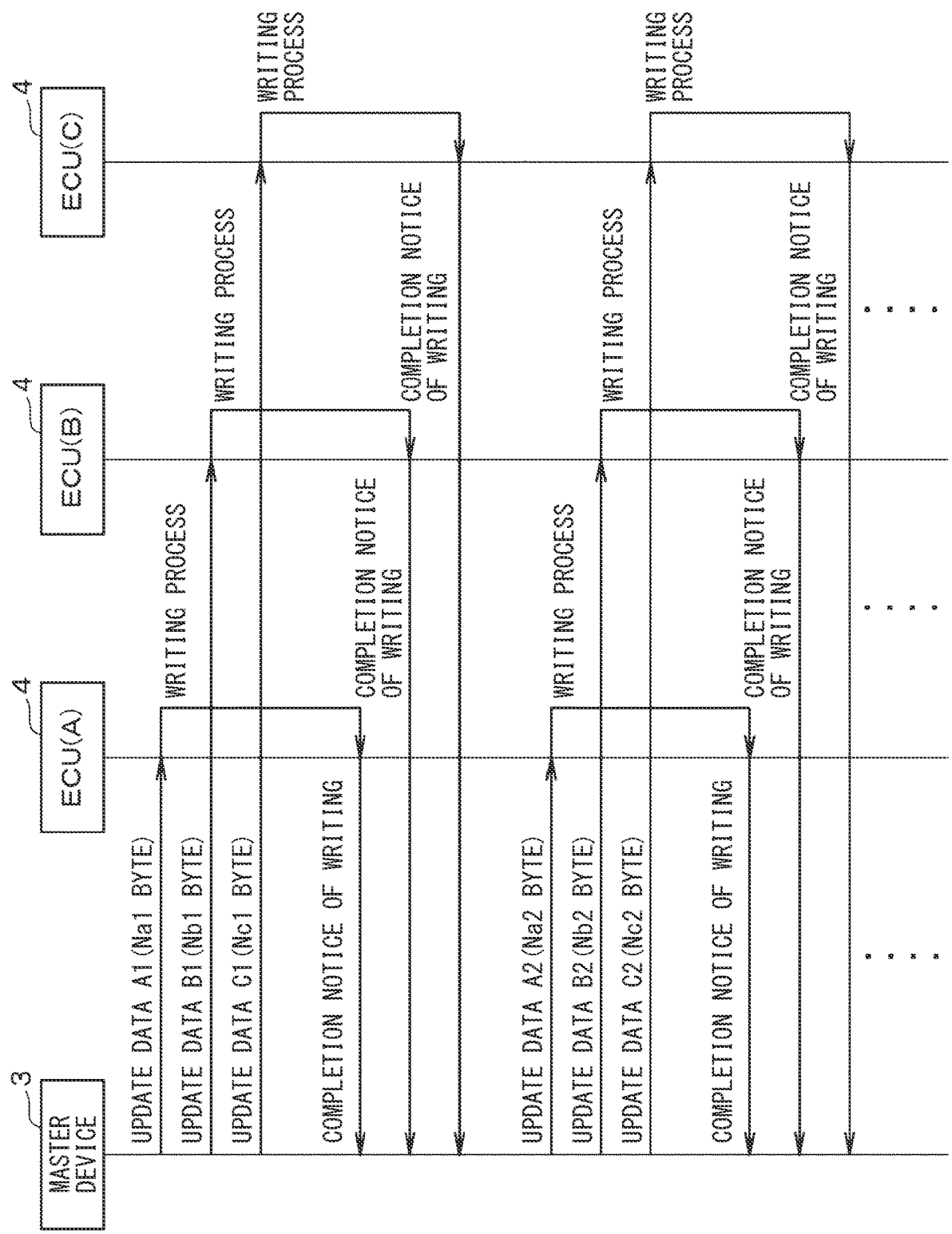
FIG. 5 is a diagram showing a feature in which a master device executes a transfer process of the update data in parallel.

As shown in FIG. 5, when the master device 3 downloads a package, in which the update data A1, the update data B1, and the update data C1 are packaged as one file, from the data distribution device 2, the master device 3 unpackages the downloaded package to extract the update data A1, the update data B1, and the update data C, and executes the transfer processing for transferring the update data A1 to the writing target ECU A, the transfer processing for transferring the update data B1 to the writing target ECU B, and the transfer processing for transferring the update data C1 to the writing target ECU C in parallel. That is, after transferring the update data A1 to the writing target ECU A, and before receiving the completion notice of writing from the writing target ECU A, the master device 3 transfers the update data B1 to the writing target ECU B, and transfers the update data C1 to the writing target ECU C.

When the update data A1 is transferred from the master device 3, the write target ECU A starts a writing process of writing the transferred update data A1 to the memory, and when the writing process is completed, the writing completion notice is transmitted to the master device 3. When the update data B1 is transferred from the master device 3, the write target ECU B starts a writing process of writing the transferred update data B1 to the memory, and when the writing process is completed, the writing completion notice is transmitted to the master device 3. When the update data C1 is transferred from the master device 3, the write target ECU C starts a writing process of writing the transferred update data C1 to the memory, and when the writing process is completed, the writing completion notice is transmitted to the master device 3.

Figure 6:
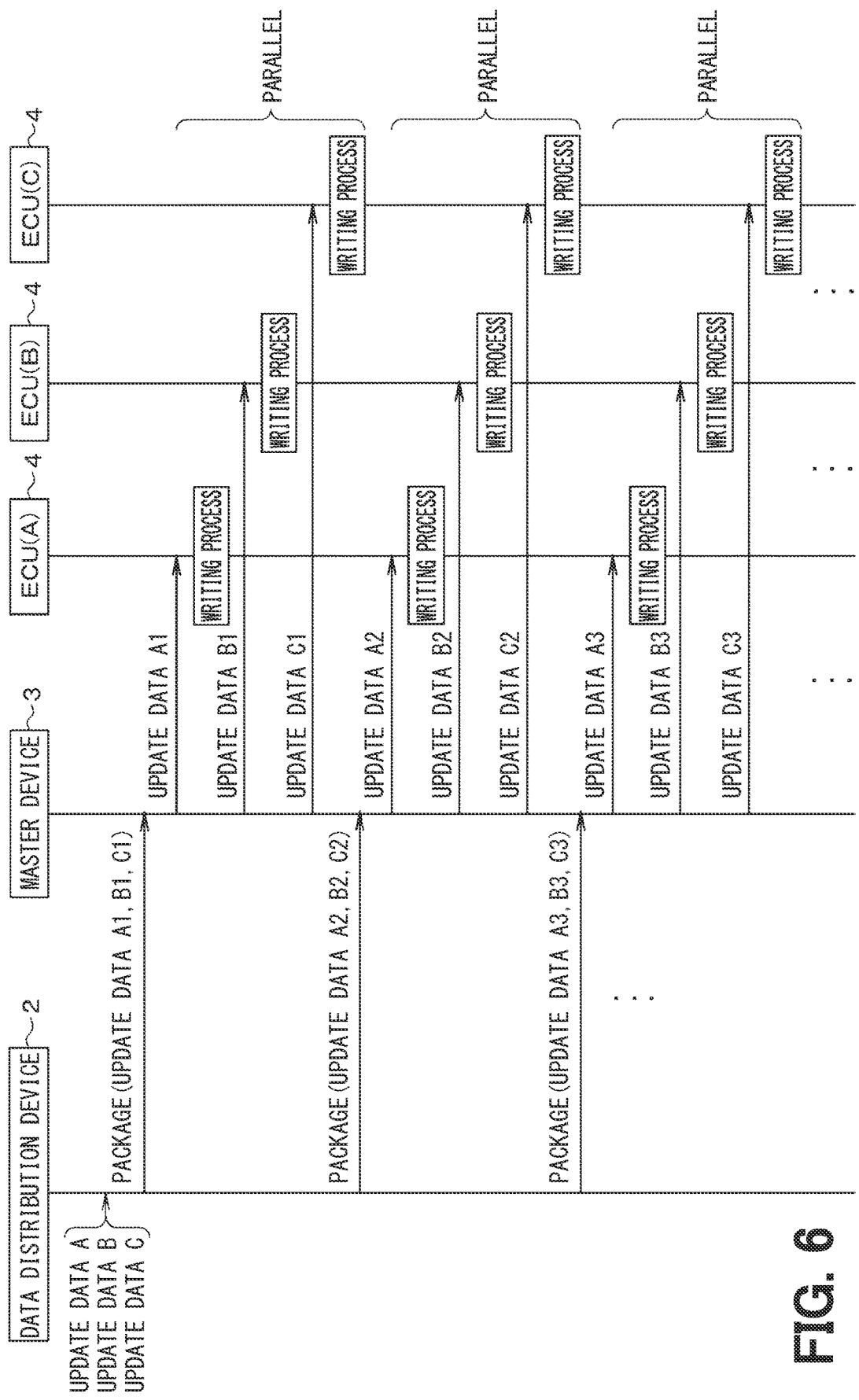
FIG. 6 is a diagram showing a feature in which a data distribution device distributes a package and a feature in which a master device transfers update data.

That is, as shown in FIG. 6, the data distribution device 2 distributes the package, in which the update data A1, the update data B1, and the update data C1 are packaged, to the master device 3, so that the transfer process of transferring the update data A1 to the writing target ECU A, the transfer process of transferring the update data B1 to the writing target ECU B, and the transfer process of transferring the update data C1 to the writing target ECU C are executed in parallel by the master device 3. Therefore, the writing target ECU A, the writing target ECU B, and the writing target ECU C can execute the writing processing of the update data A1, the writing processing of the update data B1, and the writing processing of the update data C1 in parallel, respectively.

After that, in the same manner, the data distribution device 2 distributes the package, in which the update data A2, the update data B2, and the update data C2 are packaged, to the master device 3, so that the writing target ECU A, the write target ECU B, and the writing target ECU C can execute the writing process of the update data A2, the writing process of the update data B2, and the writing process of the update data C2 in parallel, respectively. The data distribution device 2 distributes the package, in which the update data A3, the update data B3, and the update data C3 are packaged, to the master device 3, so that the writing target ECU A, the writing target ECU B, and the writing target ECU C can execute the writing process of the update data A3, the writing process of the update data B3, and the writing process of the update data C3 in parallel, respectively. In this way, it is possible to execute the writing process of the update data for the writing target ECU A, the writing target ECU B, and the writing target ECU C in parallel.

Figure 7:
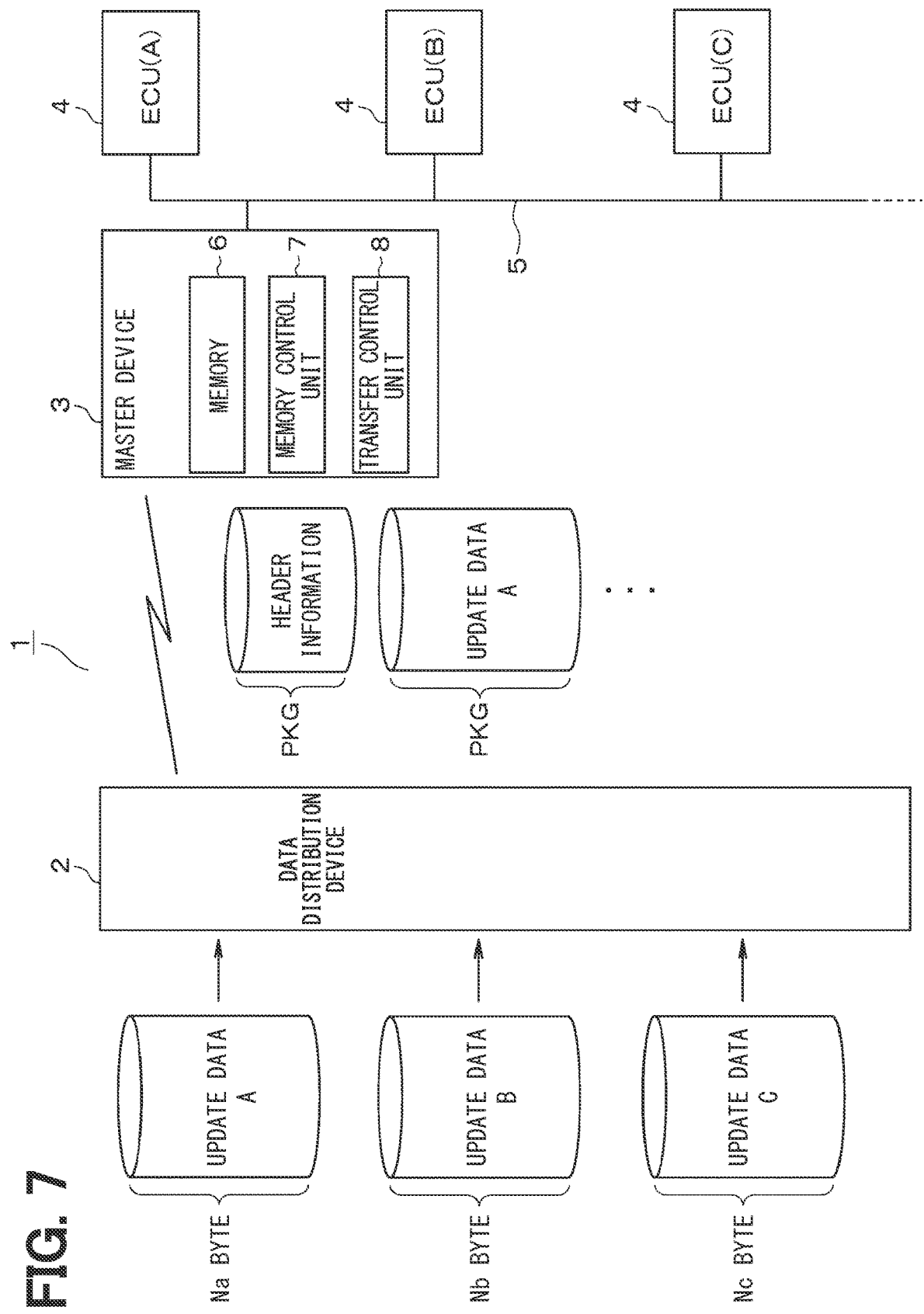
FIG. 7 is a diagram showing a comparison example.

In the configuration that does not adopt the recombination information, for example, as shown in FIG. 7, the update data is packaged in the order, in which the update data is registered, to generate the package. That is, the entire update data A is generated as one package, the entire update data B is generated as one package, and the entire update data C is generated as one package. Therefore, it is not possible to execute the update data writing process for the writing target ECU A, the writing target ECU B, and the writing target ECU C in parallel until the download of all the packages is completed. For example, when the update data A is first registered, the transfer process for transferring the update data to the writing target ECU A is started, but the transfer process for transferring the update data to the writing target ECU B and the transfer process for transferring the update data to the writing target ECU C are not executed during the execution of the transfer process for transferring the update data to the writing target ECU A.

On the other hand, in the configuration in which the recombination information is adopted as in the present embodiment, as described above, the transfer processes for transferring the update data to the writing target ECU A, the writing target ECU B, and the writing target ECU C are executed in parallel, respectively. Therefore, the time required from the start of writing the update data to the completion of the writing of all the update data can be shortened as compared with the configuration in which the recombination information is not adopted.

In the above configuration, in the writing target ECU A, writing target ECU B, and writing target ECU C, if the transfer speed of the update data from the master device 3, the speed difference between the distribution speed and the transfer speed, the writable capacity for writing the update data at one writing time, the writing speed of the update data, the total writing capacity of the update data, and the execution unit of the writing process are equivalent among the writing target ECU A, writing target ECU B, and writing target ECU C without any difference, the data amount of the update data A1, the data amount of the update data B1, and the data amount of the update data C are the same. On the other hand, if the transfer speed of the update data from the master device 3, the speed difference between the distribution speed and the transfer speed, the writable capacity in which the update data can be written by one writing time, the writing speed of the update data, and the total writing capacity of the update data, and the execution unit of the writing process are not equivalent among the writing target ECU A, writing target ECU B, and writing target ECU C with a difference, the data amount of the update data A1, the data amount of the update data B1, and the data amount of the update data C may be different from each other.

That is, for the writing target ECU 4 in which the transfer speed of the update data from the master device 3 and the writing speed of the update data are relatively high, the data amount of the update data may become relatively large. For the writing target ECU 4 in which the transfer speed of the update data from the master device 3 and the writing speed of the update data are relatively low, the data amount of the update data may become relatively small. Further, for the writing target ECU 4 in which the writable capacity for writing the update data at one writing time, the writing speed of the update data, the total writing capacity of the update data, and the execution unit of the writing process are relatively large, the data amount of the update data may become relatively large. For the writing target ECU 4 in which the writable capacity for writing the update data at one writing time, the writing speed of the update data, the total writing capacity of the update data, and the execution unit of the writing process are relatively small, the data amount of the update data may become relatively small.

Figure 8:
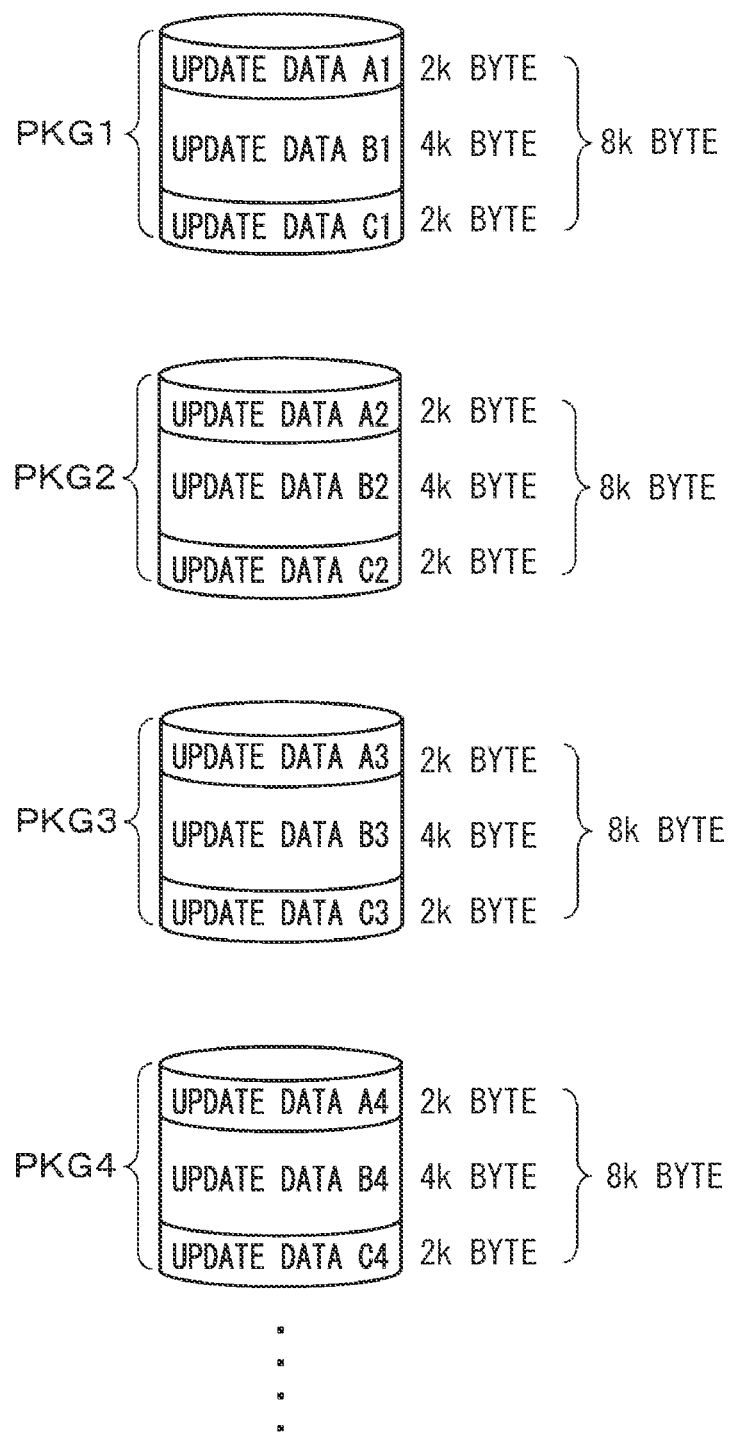
FIG. 8 is a diagram showing a structure of update data in a package.

Specifically, it will be described with reference to FIGS. 8 to 9. As shown in FIG. 8, for example, when a storage capacity of the memory 6 in the master device 3 is 16 k bytes, an execution unit of the writing process in the writing target ECU A, the writing target ECU B, and the writing target ECU C is 1 k byte, and the writing speed of the update data in the writing target ECU B is about twice higher than the writing speed of the update data in the writing target ECU A and the writing target ECU C, the control unit 9 determines that the size of the package is 8 k bytes, the structure of the update data in the package for the update data A1, A2, . . . , and C1, C2, . . . is 2 k bytes, and the structure of the update data in the package for the update data B1, B2, . . . is 2 k bytes, so that the packages 1, 2, . . . are generated.

Figure 9:
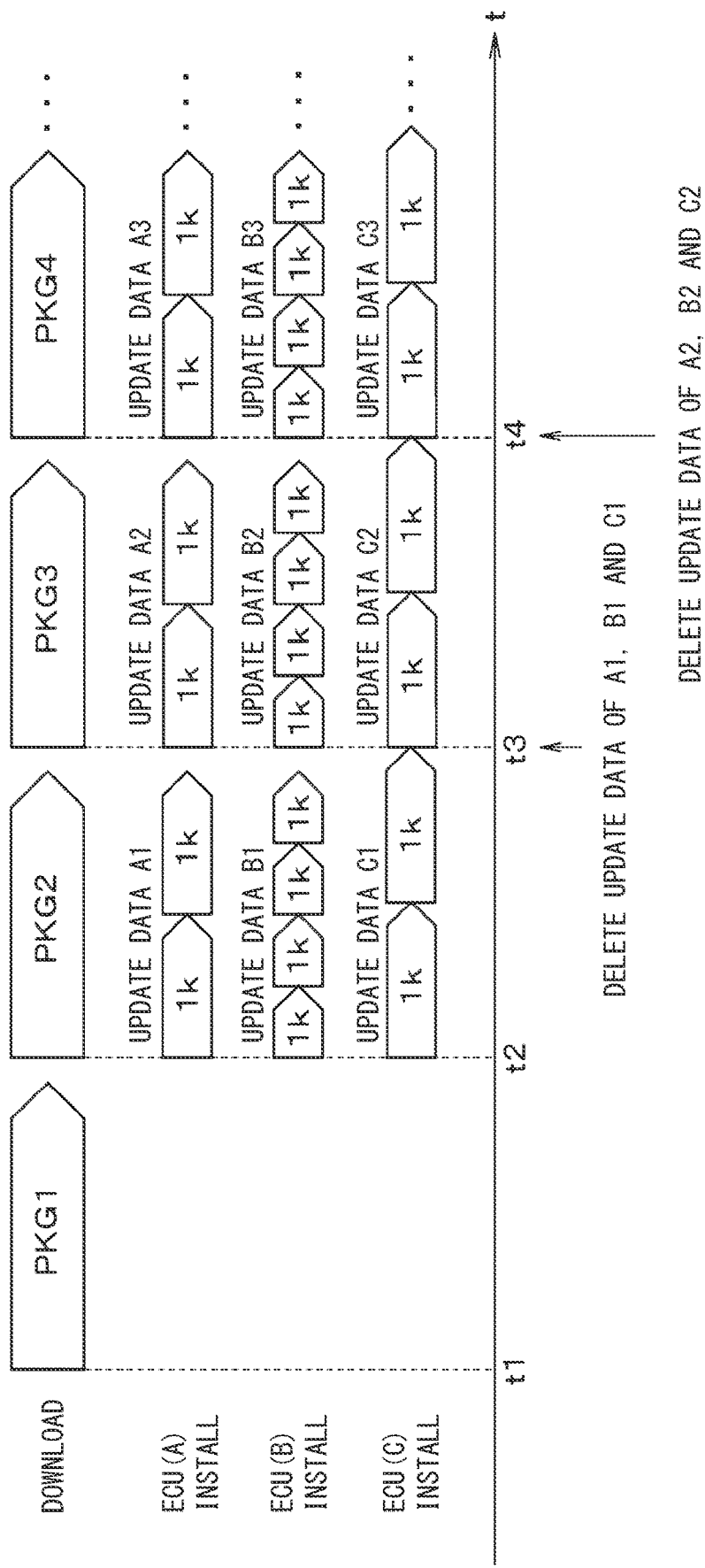
FIG. 9 is a diagram showing a timing chart.

In this case, as shown in FIG. 9, after the master device 3 downloads the package 1 (i.e., PKG1) from the data distribution device 2, the master device 3 extracts the update data A1, B1, C1 from the package 1, and respectively transfers the extracted update data A1, B1, C1 to the writing target ECU A, writing target ECU B, and writing target ECU C with the transfer unit of 1 k bytes in parallel with the download of the package 2 (i.e., PKG2) from the data distribution device 2. In this case, since the writing speed of the update data in the writing target ECU B is about twice higher than the writing speed of the update data in the writing target ECU A and the writing target ECU C, the master device 3 can increase the transfer unit of 1 k bytes per unit time with respect to the writing target ECU B to be larger than the transfer unit of 1 k bytes per unit time with respect to the writing target ECU A and the writing target ECU C. That is, the master device 3 transfers data of 1 k bytes to the writing target ECU B in a shorter cycle than the writing target ECU A and the writing target ECU C.

Further, the master device 3 receives a writing completion notification from the writing target ECU A, the writing target ECU B, and the writing target ECU C, and determines that the installation of the update data in the writing target ECU A, the writing target ECU B, and the writing target ECU C is completed, and then, the master device 3 deletes the transferred update data, transmits the package distribution request to the data distribution device 2, and requests the data distribution device 2 to distribute the next package. In FIG. 9, the master device 3 downloads the package 1 from the data distribution device 2 between time "t1" and time "t2", and when the download of the package 1 is completed, the master device 3 extracts the update data A1, B1, C1 from the downloaded package 1, starts transferring the extracted update data A1, B1, and C1, and requests the data distribution device 2 to distribute the package 2, which is the next package.

In parallel with downloading the package 2 from the data distribution device 2 between time "t2" and time "t3", the master device 3 transfers the update data A1, B1, C1 with the transfer unit of 1 k bytes to the writing target ECU A, the writing target ECU B, and the writing target ECU C. When the master device 3 determines that all the update data A1, B1, C1 have been installed at time "t3", the master device 3 deletes the update data A1, B1, C1 and requests the data distribution device 2 to distribute the package 3 as the next package.

Similarly, in parallel with downloading the package 3 from the data distribution device 2 between time "t3" and time "t4", the master device 3 transfers the update data A2, B2, C2 with the transfer unit of 1 k bytes to the writing target ECU A, the writing target ECU B, and the writing target ECU C. When the master device 3 determines that all the update data A2, B2, C2 have been installed at time "t4", the master device 3 deletes the update data A2, B2, C2 and requests the data distribution device 2 to distribute the package 4 as the next package.

In the above, the configuration in which the number of the writing target ECUs 4 is three is exemplified, alternatively, the same applies to the configuration in which the number of the writing target ECUs 4 is two or four or more. Further, although the configuration in which the writing target ECUs 4 are connected to the same bus 5 is described above, the same applies to the configuration in which the writing target ECUs 4 are connected to different buses. In that case, the structure of the update data in the package may be determined in consideration of the communication load of the bus 5, the transmittable capacity, and the like. For example, when the communication load of the bus to which the writing target ECU A is connected is relatively small, or the transmission capacity is relatively large while the communication load of the bus to which the writing target ECUs B and C are connected is relatively large, or the transmission capacity is relatively small, the data amount of the update data A1, A2, A3 may become relatively large, and the data amount of the update data B1, B2, B3 and the amount of the updated data C1, C2, C3 may become relatively small.

As described above, according to the present embodiment, the following effects can be obtained.

The data distribution device 2 acquires the recombination information for executing the transfer process of the update data to a plurality of writing target ECUs 4 in parallel, divides the acquired plurality of update data based on the recombination information to generate division data after acquiring the plurality of update data, packages the generated division data to generate a plurality of packages, and sequentially distributes the generated plurality of packages to the master device 3. By sequentially distributing the plurality of packages to the master device 3 so that the master device 3 can execute the transfer process for transferring the update data to plurality of writing target ECUs in parallel, it is possible to appropriately utilize a mechanism for executing the transfer process of the update data from the master device 3 to a plurality of writing target ECUs 4 in parallel under a situation where the master device 3 downloads the update data distributed from the data distribution device 2. By appropriately utilizing the mechanism for executing the transfer process of the update data from the master device 3 to the plurality of writing target ECUs 4 in parallel in this way, the distribution efficiency of the update data of the entire system can be appropriately improved.

In the data distribution device 2, the security of the package is protected and the security-protected package is distributed to the master device 3. Security can be ensured in the distribution of the package from the data distribution device 2 to the master device 3.

In the data distribution device 2, the storage capacity for storing data by one download action in the master device 3 is acquired, and the size of the package is determined based on the acquired storage capacity. The size of the package can be optimized based on the storage capacity for storing data by one download action in the master device 3.

In the data distribution device 2, the distribution speed information regarding the distribution speed of the package from the own device to the master device 3, the transfer speed information regarding the transfer speed of the update data from the master device 3 to the writing target ECU 4, or the speed difference information is acquired, and the structure of the update data in the package is determined based on the acquired distribution speed information, the transfer speed information, and the speed difference information. The structure of the update data in the package can be optimized based on the distribution speed information, the transfer speed information, and the speed difference information.

In the data distribution device 2, the writing capacity for writing the update data by one writing action in the writing target ECU 4 is acquired, and the structure of the update data in the package is determined based on the acquired writing capacity. The structure of the update data in the package can be optimized based on the writing capacity for writing the update data by one writing action in the writing target ECU 4.

In the data distribution device 2, the writing speed of the update data in the writing target ECU 4 is acquired, and the structure of the update data in the package is determined based on the acquired writing speed. The structure of the update data in the package can be optimized based on the writing speed of the update data in the writing target ECU 4.

In the data distribution device 2, the total writing capacity of the update data in the writing target ECU 4 is acquired, and the structure of the update data in the package is determined based on the acquired total writing capacity. The structure of the update data in the package can be optimized based on the total writing capacity of the update data in the writing target ECU 4.

In the data distribution device 2, the execution unit of the writing process in the writing target ECU 4 is acquired, and the structure of the update data in the package is determined based on the acquired execution unit. The structure of the update data in the package can be optimized based on the execution unit of the writing process in the writing target ECU 4. For example, when the difference data between the old program and the new program is the update data, there may be a limit to the minimum amount of data. By determining the structure of the update data in the package based on the minimum amount of data, the structure of the update data in the package can be optimized.

In the master device 3, the download of the package from the data distribution device 2 and the transfer process of the update data to the writing target ECU 4 are executed in parallel. The time from the start of the download to the completion of the installation can be shortened. That is, in addition to executing the transfer process of the update data from the master device 3 to the plurality of writing target ECUs 4 in parallel, the package download from the data distribution device 2 and the update data transfer process to the writing target ECU 4 are performed in parallel, so that the time from the start of the download to the completion of the installation can be shortened. Further, by dividing the size of the package into smaller pieces, it may be applied even when the storage capacity of the memory 6 of the master device 3 is not large. Further, it is possible to eliminate the requirement to mount a memory having a large storage capacity on the master device 3, and it is also possible to reduce costs and reduce the size of the device.

In the master device 3, after determining the completion of writing the update data in all the writing target ECUs 4, the update data transferred to all the writing target ECUs 4 is deleted. By deleting the updated data that is no longer needed, the storage capacity of the memory 6 can be secured.

In the master device 3, after deleting the update data transferred to all the writing target ECUs 4, the distribution of the next package is required to the data distribution device 2. After securing the storage capacity of the memory 6, the next package can be appropriately downloaded from the data distribution device 2.

Although the present disclosure has been described in accordance with the embodiments, it is understood that the present disclosure is not limited to the embodiments and structures described above. The present disclosure encompasses various modification examples or variations within the scope of equivalents. Various combinations or forms as well as other combinations or forms including only one element, one or more elements, or one or less elements, fall within the scope or the spirit of the present disclosure.

The controllers and methods thereof described in the present disclosure in the above embodiments may be implemented by one or more than one special-purpose computer. Such a computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium. Alternatively, the control unit and the method according to the present disclosure may be achieved by a dedicated computer provided by constituting a processor with one or more dedicated hardware logic circuits. Alternatively, the control unit and the method according to the present disclosure may be achieved using one or more dedicated computers constituted by a combination of the processor and the memory programmed to execute one or more functions and the processor with one or more hardware logic circuits. The computer program may also be stored on a computer readable and non-transitory tangible recording medium as instructions executed by a computer.

The master device 3 may have a DCM (Data Communication Module) corresponding to the memory control unit 7 and a CGW (Central Gate Way) corresponding to the transfer control unit 8.

An external storage device may be provided separately from the master device 3, and the package distributed from the data distribution device 2 to the master device 3 may be temporarily stored in the external storage device.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data distribution device for a data distribution system including a master device that transfers an update data extracted from a package to one of a plurality of electronic control devices as a writing target, and the plurality of electronic control devices that write the update data transferred from the master device to respective memories, the data distribution device including at least a processor and memory configured to implement:

an update data acquisition unit that acquires a plurality of update data corresponding to the plurality of electronic control devices as the writing target;

a recombination information acquisition unit that acquires recombination information for the master device to execute a transfer process of transferring the update data to the plurality of electronic control devices as the writing target in parallel;

a package generation unit that divides the plurality of update data acquired by the update data acquisition unit based on the recombination information acquired by the recombination information acquisition unit to generate a division data, and packages a generated division data of the plurality of update data to generate a plurality of packages; and a distribution control unit that distributes the plurality of packages, generated by the package generation unit, to the master device.

2. The data distribution device according to claim 1, wherein:
the update data acquisition unit acquires a first update data among the plurality of update data corresponding to a first target device as a first writing target which is one of the plurality of electronic control devices and a second update data among the plurality of update data corresponding to a second target device as a second writing target which is another one of the plurality of electronic control devices;
the recombination information acquisition unit acquires the recombination information for the master device to execute a transfer process of transferring the first update data to the first target device and a transfer process of transferring the second update data to the second target device in parallel; and
the package generation unit respectively divides the first update data and the second update data acquired by the update data acquisition unit based on the recombination information acquired by the recombination information acquisition unit, and respectively packages a first division data that is prepared by dividing the first update data and a second division data that is prepared by dividing the second update data to generate one package, so that the package generation unit generates the plurality of packages.

3. The data distribution device according to claim 1, further comprising:
a security protection unit that protects a security of the package generated by the package generation unit, wherein:
the distribution control unit distributes the package, of which the security is protected by the security protection unit, to the master device.

4. The data distribution device according to claim 1, wherein:
the recombination information acquisition unit acquires a storage capacity of the master device that stores by one download action, as the recombination information; and
the package generation unit determines a size of the package based on the storage capacity acquired by the recombination information acquisition unit, and generates the package based on a determined size of the package.

5. The data distribution device according to claim 1, wherein:
the recombination information acquisition unit acquires, as the recombination information, distribution speed information regarding a distribution speed of the package from the data distribution device to the master device, transfer speed information regarding a transfer speed of the update data from the master device to the electronic control devices as the writing target, or speed difference information regarding a speed difference between the distribution speed and the transfer speed; and
the package generation unit determines a structure of the update data in the package based on a speed difference calculated by the distribution speed information, the transfer speed information or the speed difference information acquired by the recombination information acquisition unit, and generates the package based on a determined structure of the update data in the package.

6. The data distribution device according to claim 1, wherein:
the recombination information acquisition unit acquires, as the recombination information, a writing capacity for writing the update data by one writing action in the electronic control devices as the writing target; and
the package generation unit determines the structure of the update data in the package based on the writing capacity acquired by the recombination information acquisition unit, and generates the package based on a determined structure of the update data in the package.

7. The data distribution device according to claim 1, wherein:
the recombination information acquisition unit acquires, as the recombination information, a writing speed of the update data in the electronic control devices as the writing target; and
the package generation unit determines the structure of the update data in the package based on the writing speed acquired by the recombination information acquisition unit, and generates the package based on a determined structure of the update data in the package.

8. The data distribution device according to claim 1, wherein:
the recombination information acquisition unit acquires, as the recombination information, a total writing capacity of the update data in the electronic control devices as the writing target; and
the package generation unit determines the structure of the update data in the package based on the total writing capacity acquired by the recombination information acquisition unit, and generates the package based on a determined structure of the update data in the package.

9. The data distribution device according to claim 1, wherein:
the recombination information acquisition unit acquires, as the recombination information, an execution unit of the writing process in the electronic control devices as the writing target; and
the package generation unit determines the structure of the update data in the package based on the execution unit acquired by the recombination information acquisition unit, and generates the package based on a determined structure of the update data in the package.

10. The data distribution device according to claim 1, further comprising:
one or more processors; and
a memory coupled to the one or more processors and storing program instructions that when executed by the one or more processors cause the one or more processors to provide at least: the update data acquisition unit; the recombination information acquisition unit; the package generation unit; and the distribution control unit.

11. The data distribution device according to claim 1, wherein:
the recombination information is information for the master device to transfer the update data to the plurality of electronic control devices in the vehicle in parallel.

12. The data distribution device according to claim 1, wherein:
the package generation unit divides each of the plurality of update data based on the recombination information to generate a plurality of division data; and
the package generation unit packages the plurality of division data into a single file to generate the plurality of packages, which are a plurality of files.

13. The data distribution device according to claim 1, wherein the recombination information includes at least one of: storage capacity information indicating a storage capacity of the master device; distribution speed information indicating a distribution speed of the package from the data distribution device to the master device; transfer speed information indicating a transfer speed of the update data from the master device to the electronic control devices; speed difference information indicating a speed difference between the distribution speed and the transfer speed; writing capacity information indicating a writing capacity for writing the update data by one writing action in the electronic control devices as the writing target; writing speed information indicating a writing speed of the update data in the electronic control devices as the writing target; total writing capacity information indicating a total writing capacity acquired by the recombination information acquisition unit; and execution unit information indicating an execution unit of the writing process in the electronic control devices as the writing target.

14. A data distribution system comprising:
   a data distribution device that distributes a package including an update data to a master device; and
   the master device that extracts the update data from the package downloaded from the data distribution device, and transfers an extracted update data to a plurality of electronic control devices as a writing target, wherein:
   the data distribution device includes at least a processor and memory configured to implement:
      an update data acquisition unit that acquires a plurality of update data corresponding to the plurality of electronic control devices as the writing target;
      a recombination information acquisition unit that acquires recombination information for the master device to execute a transfer process of transferring the update data to the plurality of electronic control devices as the writing target in parallel;
      a package generation unit that divides the plurality of update data acquired by the update data acquisition unit based on the recombination information acquired by the recombination information acquisition unit to generate a division data, and packages a generated division data of the plurality of update data to generate a plurality of packages; and
      a distribution control unit that distributes the plurality of packages, generated by the package generation unit, to the master device.

15. The data distribution system according to claim 14, further comprising:
   one or more processors; and
   a memory coupled to the one or more processors and storing program instructions that when executed by the one or more processors cause the one or more processors to provide at least: the data distribution device; the master device; the update data acquisition unit; the recombination information acquisition unit; the package generation unit; and the distribution control unit.

16. The data distribution system according to claim 14, wherein:
   the master device executes downloading of the package from the data distribution device and transferring of the update data to the electronic control devices as the writing target in parallel.

17. The data distribution system according to claim 14, wherein:
   the master device deletes the update data transferred to all the electronic control devices as the writing target after determining a completion of writing the update data in all the electronic control devices as the writing target.

18. The data distribution system according to claim 17, wherein:
   the master device requests the data distribution device to distribute a next package after deleting the update data transferred to all the electronic control devices as the writing target.

19. A data distribution system comprising:
   a data distribution device that distributes a package including an update data to a master device;
   the master device that extracts the update data from the package downloaded from the data distribution device, and transfers an extracted update data to a plurality of electronic control devices as a writing target; and
   the plurality of electronic control devices that write the update data transferred from the master device in a memory, wherein:
   the data distribution device includes at least a processor and memory configured to implement:
      an update data acquisition unit that acquires a plurality of update data corresponding to the plurality of electronic control devices as the writing target;
      a recombination information acquisition unit that acquires recombination information for the master device to execute a transfer process of transferring the update data to the plurality of electronic control devices as the writing target in parallel;
      a package generation unit that divides the plurality of update data acquired by the update data acquisition unit based on the recombination information acquired by the recombination information acquisition unit to generate a division data, and packages a generated division data of the plurality of update data to generate a plurality of packages; and
      a distribution control unit that distributes the plurality of packages, generated by the package generation unit, to the master device.

20. The data distribution system according to claim 19, further comprising:
   one or more processors; and
   a memory coupled to the one or more processors and storing program instructions that when executed by the one or more processors cause the one or more processors to provide at least: the data distribution device; the master device; the update data acquisition unit; the recombination information acquisition unit; the package generation unit; and the distribution control unit.

21. A non-transitory tangible computer readable storage medium comprising instructions being executed by a computer, the instructions including a computer-implemented method for a control unit in a data distribution device for a data distribution system including a master device that transfers an update data extracted from a package to one of a plurality of electronic control devices as a writing target, and the plurality of electronic control devices that write the update data transferred from the master device to respective memories, the instructions including:
   acquiring a plurality of update data corresponding to the plurality of electronic control devices as the writing target;
   acquiring recombination information for the master device to execute a transfer process of transferring the update data to the plurality of electronic control devices as the writing target in parallel;
   dividing the plurality of update data acquired in the acquiring of the plurality of update data based on the recombination information acquired in the acquiring of the recombination information to generate a division data;

packaging a generated division data of the plurality of update data to generate a plurality of packages; and distributing the plurality of packages, generated in the packaging of the generated division data, to the master device.

\* \* \* \* \*